2,985,607
RUBBER ADDITIVES

James O. Koehler, Parma, Ohio, and Headlee Lamprey, Lewiston, N.Y., assignors to Union Carbide Corporation, a corporation of New York
No Drawing. Filed Mar. 5, 1957, Ser. No. 643,916
6 Claims. (Cl. 260—23.7)

This invention relates to rubber additives which improve and facilitate rubber processing.

In the processing of rubber stock, it is conventional practice to use dispersants and lubricants such as petrolatum, palm oil, hydrocarbon waxes and stearic acid to diminish the frictional drag of the stock in the extruder and die, and to impart a smooth finish to the extruded article. After extrusion, rubber is vulcanized, and in this operation the above-mentioned additives function as activators. Incorporation of such additives in the warm masticated stock often results in the condition known as "bloom," which is detrimental to the building properties of rubber. Stearic acid, in particular, also causes a decrease in the extrusion rate of natural rubber.

A similar problem arises also in the case of the so-called "silicone" rubber. Silicone compounds containing highly reinforced silica fillers, immediately after compounding are tractable materials which can be shaped to desired configurations. Subsequent curing of such compounds produces an optimum combination of elongation and hardness properties in the end product. It has been noted, however, that if after compounding, such silicone compounds are "bin-aged" by storing or by standing for about a week, they "crepe-harden" or build up structure and become hard and brittle. Before use, such bin-aged compounds must be regenerated to a working mass by remilling or remixing procedures. Curing of bin-aged and regenerated silicone compounds results in a rubber significantly poorer in quality than that prepared from non-bin-aged compounds.

Bearing in mind the above-outlined problems confronting rubber technology, the main object of the present invention is to provide novel rubber lubricant and activator additives effective in natural and synthetic rubber compositions to promote an optimum combination of elongation and hardness properties.

An equally important object of the invention is to incorporate in rubber mixes, prior to extrusion, certain novel additives whereby their extrusion rate as well as their rate of cure may be increased.

Before extrusion, rubber stock is masticated in Banbury or other masticators to warm it, and increase its plasticity. Mastication allows the stock to knit uniformly, and to flow smoothly through the extruder. In the practice of the invention, therefore, from about 0.4 to about 3.5 percent of certain organo-metallic compounds of silicon, tin, zirconium and lead, and mixtures thereof, are added to the masticating rubber mass prior to its extrusion.

The additive compounds employed in the present invention fall into the following general classifications:

(a) Metal acylates—

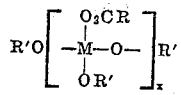

M=silicon, tin or lead (excluding, therefore, such compounds as zirconium silicate).
R=an alkyl, alkaryl, aralkyl, or a substituted alkyl, alkaryl, or aralkyl group of 10 to 20 carbon atoms.
R'=hydrogen, alkyl, or substituted alkyl group of 1 to 4 carbon atoms.
x=small whole number.

(b) Aminoalcohol derivatives—

M=silicon, tin, lead, zirconium.
R=short chain alkyl group, 1 to 4 carbons.
R'=hydrogen or short chain alkyl group, 1 to 4 carbons.
R''=long chain alkyl or substituted alkyl group.
x=small whole number 0 to 3.
Y=alkylene or substituted alkylene group.
Z=small number $0 \leq Z \leq (4-x)$.
A=small number from 0 to 2.

(c) Polyhydric alcohol derivatives—

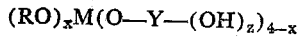

R=short chain alkyl group, 1 to 4 carbons.
M=silicon, tin, lead, zirconium.
Y=substituted alkylene group.
z=small number from 1 to 3.
x=small number from 0 to 3.

The above compounds may be prepared by any suitable method, e.g., the metal carboxylates can be prepared by reacting an organic ester having the formula $M(OR')_4$ with an aliphatic acid having the formula RCOOH, where R is a group having from 10 to 18 carbon atoms, followed by the vacuum distillation of the alcohol by-product. The metal aminoalcohol salt suitably can be prepared by refluxing an organic ester having the formula $(OR)_4M$ with an aminoalcohol. The resultant product then is shaken with a long chain aliphatic acid. To prepare the metal polyhydric alcoholates, an organic ester having the formula $(RO)_4M$ is refluxed with a dihydroxy alcohol to provide the final product by transesterification.

The additives of the invention are described in greater details together with their mode of preparation in the co-pending applications of H. Lamprey and J. O. Koehler, Serial No. 578,782, filed April 17, 1956, and Serial No. 629,797, filed December 21, 1956.

All the results hereinafter tabulated were obtained from tests run on smoked sheets of natural rubber containing M.P.C. channel black as the filler. A Blank containing no additive and a control batch containing stearic acid as the additive were run along with similar rubber compositions containing the additives of the invention. The following list of additives were tested in rubber formulations, and will be referred to throughout this application by the code letters indicated in Table I.

Table I

| Code | Chemical Name |
|---|---|
| A | Isopropoxy Stearoxy Polystannate. |
| B | Diethoxy-di-(triethanolamine)-silicate-N,N-dioleate. |
| C | Diethoxy-di-(triethanolamine)-silicate-N,N-dioleate. |
| D | Dibutoxy di-(triethanolamine)-silicate-N,N-distearate. |
| E | Diethoxy-di-(triethanolamine)-silicate-N,N-dioleate. |
| F | Diethoxy-di-(2-ethylhexanediol-1,3)-silicate. |
| G | Diethoxy-di-(triethanolamine)-silicate-N-oleate. |
| H | Diethoxy-di-(triethanolamine)-silicate-Tetra-(2-ethyl-hexanediol-1,3)-zirconate. |

The rubber stocks had the composition by weight shown in Table II.

Table II

| Ingredient | Blank | Control | Experimental |
|---|---|---|---|
| Smoked Sheet | 100 | 100 | 100 |
| M.P.C. Channel Black | 50 | 50 | 50 |
| Stearic Acid | | 4 | |
| Additives | | | 4 |

All the experimental rubber stocks were mixed in a Banbury masticator using controlled conditions. Banbury rotors and jackets were brought to the same temperature (145° F.) during the mix. The additive and smoked sheets of natural rubber were mixed in the Banbury for 6 hours at 145° F. Then one-half of the channel black was added to the rubber additive mixture and mixing was continued for another 2 hours. The rest of the channel black was added, and the mixing continued 4 hours longer. The stock was dumped at the end of the 12 hours' mixing cycle. The stock dumping temperature and the total power consumption (watt-hrs.) during the mixing operation are tabulated in Table III.

*Table III*

| Stock | Stock Dumping Temp. (° F.) | Power Consumed (watt-hrs.) |
|---|---|---|
| Blank | 260 | 676 |
| Control (Stearic Acid) | 256 | 550 |
| Additive: | | |
| A | 246 | 577 |
| B | 259 | 492 |
| C | 256 | 524 |
| D | 260 | 501 |
| E | 261 | 680 |
| F | 259 | 588 |
| G | 258 | 582 |

From the Banbury mixing data it can be noted that all the additive-modified stocks with the exception of E consume less power than the blank. This fact indicates that all these additives possess dispersant characteristics with respect to rubber. None of the additives gave dumping temperatures higher than the blank. If the dumping temperature is too high, rubber tends to scorch and deteriorate in physical properties; thus any additive which causes a substantial increase in the dumping temperature, which is essentially the mixing temperature, is deleterious to the rubber. Two of the compounds, B and D, show very low power consumptions, much lower than stearic acid, which indicates high lubricity and good tubing qualities.

The Banbury mixed stocks were sheeted off the laboratory mill after a three minute bleeding period and observed after 48 hours. The results of these observations are as indicated in Table IV.

*Table IV*

| Stock | Surface Bloom | Stock Tack | General Appearance | Visual Quality of Dispersion |
|---|---|---|---|---|
| Blank | None | Slight | Good | Good. |
| Control (Stearic Acid) | Considerable. | None | Poor | Do. |
| Additive: | | | | |
| A | None | do | Fair | Do. |
| B | do | Slight | Good | Do. |
| C | Slight | None | do | Do. |
| D | None | Considerable. | do | Do. |
| E | do | do | do | Do. |
| F | do | Slight | do | Do. |
| G | do | V. Slight | do | Do. |

Fatty acid bloom from uncured stock in process is detrimental to the general building qualities of rubber where parts need to be assembled. In the above table stearic acid is the worst offender. None of the stocks containing additives, with the exception of C, showed any surface bloom, and in its case, this was only slight. Stocks containing B, F, and G exhibited the most desirable tact.

Forty-eight hours after sheeting off the mill, the stocks were re-warmed on the laboratory mill and extruded through a "Garvey Die" to provide an indication of the tubing qualities of the stock based on the rate of extrusion and general appearance. The extrusion data appear in Table V.

*Table V*

| Stock | Tuber Temp., ° C. | Screw Speed, r.p.m. | Time of Extrusion, min. | Weight of Stock Extruded (gm.) | Length of Extruded Piece |
|---|---|---|---|---|---|
| Blank | 180 | 45 | 1 | 450 | 14' 5" |
| Control (Stearic Acid) | 180 | 45 | 1 | 448 | 13' 6" |
| Additive: | | | | | |
| A | 180 | 45 | 1 | 455 | 16' 1" |
| B | 180 | 45 | 1 | 453 | 15' 1" |
| C | 180 | 45 | 1 | 449 | 14' 1" |
| D | 180 | 45 | 1 | 456 | 14' 5" |
| E | 180 | 45 | 1 | 479 | 15' 0" |
| F | 180 | 45 | 1 | 435 | 13' 9" |
| G | 180 | 45 | 1 | 446 | 14' 0" |

The data in this table show that the additives are all more effective than stearic acid as a lubricant as indicated by the greater length extruded. Stocks containing A, B and E are considerably more effective than stearic acid as die lubricants. The improvement is 22 percent in the case of A instead of 12 percent for stearic acid. The appearance of all the additive-containing stocks was good.

Blank, stearic acid and additive B stocks were cured in order to compare the physical properties of the stocks. The experimental stocks were taken and mixed with the following ingredients by weight:

| Ingredient: | Parts by weight |
|---|---|
| Experimental stock | 154.00 |
| Zinc oxide | 5.00 |
| B.L.E. | 1.00 |
| Pine tar oil | 3.00 |
| Sulfur | 3.00 |
| M.B.T. | 0.75 |

The stocks were taken and cured at 274° F. for varying lengths of time. The various physical properties were measured during this test and tabulated in Table VI.

*Table VI*

| Stock | Time of Cure (min.) | Modulus 300% | Modulus 500% | Tensile, lbs./in.² | Percent Elong. | Percent Set. | Shore Hardness | Stock Gravity | T-50 |
|---|---|---|---|---|---|---|---|---|---|
| Blank | 20 | 795 | 2,050 | 3,775 | 695 | 34 | 56 | 1.131 | +13.1° C. |
|  | 30 | 1,080 | 2,630 | 4,180 | 670 | 44 | 60 | 1.131 | +6.7° C. |
| Control (Stearic Acid) | 45 | 1,330 | 2,050 | 4,450 | 655 | 49 | 64 |  | −0.4. |
|  | 60 | 1,530 | 3,330 | 4,450 | 625 | 61 | 65 |  | −5.3. |
|  | 90 | 1,810 | 3,650 | 4,490 | 585 | 50 | 68 |  | −12.5. |
|  | 20 | 1,180 | 2,850 | 4,490 | 665 | 50 | 64 |  | +1.0° C. |
|  | 30 | 1,390 | 3,090 | 4,470 | 650 | 55 | 67 | 1.138 | −3.3. |
| Additive B | 45 | 1,550 | 3,340 | 4,480 | 625 | 55 | 70 |  | −8.8. |
|  | 60 | 1,620 | 3,370 | 4,320 | 605 | 56 | 70 |  | −12.3. |
|  | 90 | 1,700 | 3,420 | 4,290 | 595 | 54 | 70 |  | −14.2. |

The above properties and their measurements are all well-known. For the purposes of the above table, hardness is the degree of indentation produced in the rubber by a plunger or indentor under a specific load as measured with a Shore A durometer. The values range from 0 to a maximum hardness of 100.

Additive B shows a greater activation than stearic acid, and develops equally as good maximum physical properties. Additive B is much faster in curing than the Blank. With as much activation as is shown by additive B, the over-cured physicals have held up well with no appreciable increase in modulus or reduction in ultimate elongation.

Although the data shown above were obtained with natural rubber compositions, equally effective results were obtained with the use of additives of this invention in silicone rubbers and in synthetic rubbers such as buna-type, butadiene-styrene compositions.

The additives of the invention have given good results also with silicone rubbers (hydrocarbon-substituted linear or cyclic polysiloxanes) prepared by blending, co-polymerization or co-equilibration methods.

In producing improved silicone rubber compositions in accordance with the practice of the invention, any filler material of the highly-reinforcing type or any suitable combination of such fillers may be employed following heretofore customary procedures. Normally present in typical silicone rubber recipes are finely-divided silica-base fillers of the highly reinforcing type characterized by particle diameters less than 500 millimicrons, and by surface areas greater than 50 square meters per gram. Inorganic filler materials of a particle diameter and surface area other than stipulated above can be employed therewith. By way of illustration, filler materials such as titania, iron oxide, aluminum oxide and inert fillers such as diatomaceous earth, calcium carbonate and quartz are preferably employed without interfering with the additives of the invention, in combination with silica fillers to lend substance to rubbers produced for those applications requiring only small amounts of a highly reinforcing silica filler.

The following fillers are suitable for use with silicone and synthetic rubbers, and in place of M.P.C. channel black in natural and synthetic rubbers:

Fillers

| Trade Name | Manufacturer | Chemical Composition |
|---|---|---|
| Hi-Sil X-303 | Columbia Southern Chemical Corporation. | Finely divided silica. |
| Cabosil | G. L. Cabot Company. | Air-floated silica. |
| Lithopone | New Jersey Zinc Sales Company. | Barium sulfate-zinc sulfide. |
| Iceberg | Burgess Pigment Company. | Aluminum Silicate. |
| Gomaco | N. G. Schabel Company. | Calcium Carbonate. |

Using 1 percent by weight of compound H tetra-(2-ethyl-hexandiol-1,3)-zirconate, it was possible to fill on a two-roll mill, a silicone rubber stock (Linde W-96 obtainable from Linde Air Products Company, a division of Union Carbide and Carbon Corporation, 30 East 42 Street, New York, N.Y.) with 50 percent more "Cabosil" filler than possible in the absence thereof. The silicone stock containing the additive and the filler exhibited better cohesiveness than the same stock containing less filler and no zirconium additive. This fact indicates that the zirconium compound permitted the silicone to wet the filler more easily and suspend the filler more uniformly throughout the rubber. It was observed that silicone compound modified with the additives of the invention does not crepe harden even if bin-aged.

Rubber compositions prepared in accordance with the method of the invention possess improved elongation properties as well as an improved over-all combination of physical properties (particularly the combination of hardness and elongation properties) as compared with compositions devoid of the additives of the invention.

What is claimed is:

1. A rubber composition consisting of rubber stock, about 50 parts by weight of a filler, and about 4 parts by weight of isopropoxy stearoxy polystannate, having the formula:

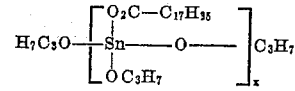

2. A rubber composition containing about 100 parts by weight of a rubber material selected from the group consisting of natural rubber, synthetic rubber and about 50 parts by weight of a filler, and about 4 parts by weight of tetra-(2-ethyl hexandiol-1,3) zirconate, having the formula:

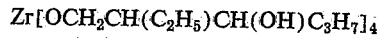

3. In the process of masticating rubber to warm the same and increase its plasticity before extrusion, the improvement which consists in adding to said rubber from 0.4 percent to 3.5 percent by weight thereof of an additive selected from the group consisting of the acylates of tin, lead and silicon, and mixtures thereof, said acylates having the formula

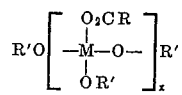

wherein R is a member selected from the group consisting of the alkyl, alkaryl, aralkyl, the substituted alkyl, alkaryl and aralkyl radicals having from 10 to 20 carbon atoms, M is a metal selected from the group consisting of silicon, tin and lead, R' is a member selected from the group consisting of hydrogen and the alkyl and substituted alkyl radicals having from 1 to 4 carbon atoms, and $x$ is a small whole number.

4. In the process of masticating rubber to warm the same and increase its plasticity before extrusion, the improvement which consists in adding to said rubber from 0.4 percent to 3.5 percent by weight thereof of isopropoxy stearoxy polystannate, having the formula:

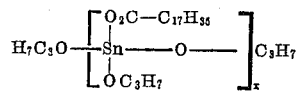

5. In the process of masticating rubber to warm the same and increase its plasticity before extrusion, the improvement which consists in adding to said rubber from 0.4 percent to 3.5 percent by weight thereof of tetra-(2-ethyl hexandiol-1,3) zirconate, having the formula:

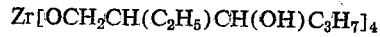

6. Rubber stock modified in properties by incorporation therein of at least one additive selected from the group consisting of the acylates of tin, lead and silicon; the amino alcohols of tin, lead, silicon and zirconium; and the polyhydric alcoholates of tin, lead, silicon, zirconium and mixtures thereof, said acylates having the formula

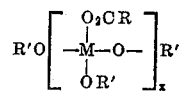

wherein R is a member selected from the group consisting of the alkyl, alkaryl, aralkyl, the substituted alkyl, alkaryl and aralkyl radicals having from 10 to 20 carbon atoms, M is a metal selected from the group consisting of silicon, tin and lead, R' is a member selected from the group consisting of hydrogen, and the alkyl and substituted alkyl radicals having from 1 to 4 carbon atoms, and $x$ is a small whole number; said aminoalcohols having the formula:

$$(RO)_xM(O-Y-NR'_2)_{4-x} \cdot A(HO_2CR'')$$

wherein M is a metal selected from the group consisting of silicon, tin, lead and zirconium, R is an alkyl group having from 1 to 4 carbon atoms, R' is selected from the group consisting of hydrogen and the alkyl groups having from 1 to 4 carbon atoms, R'' is a member selected from the group consisting of the long chain alkyl and substituted alkyl groups, Y is a member selected from the group consisting of alkylene and substituted alkylene groups, $x$ is a small member ranging from 0 to 3, and A is a number ranging from 0 to 2; said polyhydric alcoholates having the formula:

$$(RO)_xM[OY-(OH)_z]_{4-x}$$

wherein M is a metal selected from the group consisting of silicon, tin, lead and zirconium, R is an alkyl group having from 1 to 4 carbon atoms, Y is a substituted alkylene radical, $z$ is a number ranging from 1 to 3 and $x$ is a number ranging from 0 to 3; said additive being present to the extent of about 0.4 to about 3.5 percent by weight of said rubber stock.

References Cited in the file of this patent

UNITED STATES PATENTS

| | | |
|---|---|---|
| 2,476,307 | Klein et al. | July 19, 1949 |
| 2,480,620 | Warrick | Aug. 30, 1949 |
| 2,541,896 | Vasileff et al. | Feb. 13, 1951 |
| 2,615,861 | Peyrot et al. | Oct. 28, 1952 |
| 2,634,285 | Rust et al. | Apr. 7, 1953 |
| 2,681,922 | Balthis | June 22, 1954 |
| 2,708,203 | Haslam | May 10, 1955 |
| 2,824,114 | Bostwick | Feb. 18, 1958 |
| 2,824,115 | Beacham et al. | Feb. 18, 1958 |
| 2,875,919 | Henderson | Mar. 3, 1959 |
| 2,885,419 | Beinfest et al. | May 5, 1959 |